Sept. 22, 1925.                F. G. OSTRANDER                 1,554,518
                             WEED PULLER ATTACHMENT
                              Filed Sept. 15, 1924

INVENTOR
FREDERICK G. OSTRANDER.

Patented Sept. 22, 1925.

1,554,518

UNITED STATES PATENT OFFICE.

FREDERICK G. OSTRANDER, OF BERKELEY, CALIFORNIA.

WEED-PULLER ATTACHMENT.

Application filed September 15, 1924. Serial No. 737,740.

*To all whom it may concern:*

Be it known that I, FREDERICK G. OSTRANDER, a citizen of the United States, and a resident of the city of Berkeley, in the county of Alameda and State of California, have invented a new and useful Weed-Puller Attachment, of which the following is a specification.

This invention relates to a device for pulling or extracting weeds from soil. More particularly it relates to an attachment which may be applied to hand tools having round shanks and particularly to screw drivers, to convert them into efficient instrumentalities for this purpose. This attachment may rest upon the soil or ground while the tool is manipulated, serving as a fulcrum, while the root of the weed is loosened or extracted by the tool.

It has been customary to utilize an ordinary screw driver or the like for prodding beneath the root of the weed and thus loosening it from the soil. When so used however, there being no fulcrum at the surface of the soil, the shank of the screw driver sinks into the soil and thus permits but slight movement of the soil around and about the weed, and fails to loosen the root of the weed effectively to permit its removal without breaking the root. This renders the manipulation of the tool ineffective. It is one of the objects of my invention to provide a rest or fulcrum for such a hand tool whereby an appreciable leverage may be obtained on the handle, and whereby the weed may be loosened and easily removed.

It is also well known that weeds are of varying sizes, some having a short root and others a longer root. It is still another object of my invention to provide an adjustable fulcrum for the screw driver or other tool whereby the shank thereof may be imbedded to a greater or lesser extent into the soil as required by the size of the weed to be extracted.

In some instances the weed root is of such form that the hand tool must be moved latterally by an appreciable amount in order to loosen it sufficiently. This is accomplished in a highly satisfactory manner by the aid of my invention, which permits lateral movement of the hand tool while maintaining a proper fulcrum point.

My invention possesses other advantageous features, some of which with the foregoing will be set forth at length in the following description, where I shall outline in full that form of the invention which I have chosen for illustration in the drawings accompanying and forming part of the present specification. Although I have shown in the drawings but one form of my invention, I do not desire to be limited thereto, as the invention may be embodied in other forms also.

Referring to the drawings.

Figure 1:
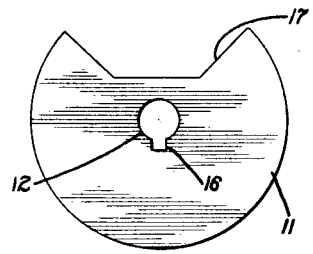
Figure 1 is a plan view of an attachment embodying my invention.

The attachment as shown most clearly in Fig. 1, comprises a flat plate 11 through which an aperture 12 is formed. The device can be most readily manufactured by stamping or punching. Through this aperture 12 may extend the shank 13 of a hand tool such as a screw driver 14. In order to permit the wide blade 15 of the screw driver to enter through the aperture 12, I provide a slot 16 in this aperture. It is evident that the edge of the plate 11, which in the present instance is shown as curved, may rest upon the soil and serve as a fulcrum point for the shank 13 of the screw driver 14 from any angle embraced within the curve. In the present instance the plate 11 is substantially circular in form with a wide and deep slot 17 at the top, said slot having converging sides. The slot 17 thus forms a sight that permits easy adjustment of the tool with respect to the weed; however, it serves another important function in keeping the slot 17 in vertical position due to the distribution of the weight. Thus the slot presents a position at right angles with the flat blade 15 of the screw driver, which for operation on the root is held substantially horizontally. In this way it is assured that the attachment 11 will not inadvertently slip off when being carried from place to place in the hand of the operator.

Figure 2:
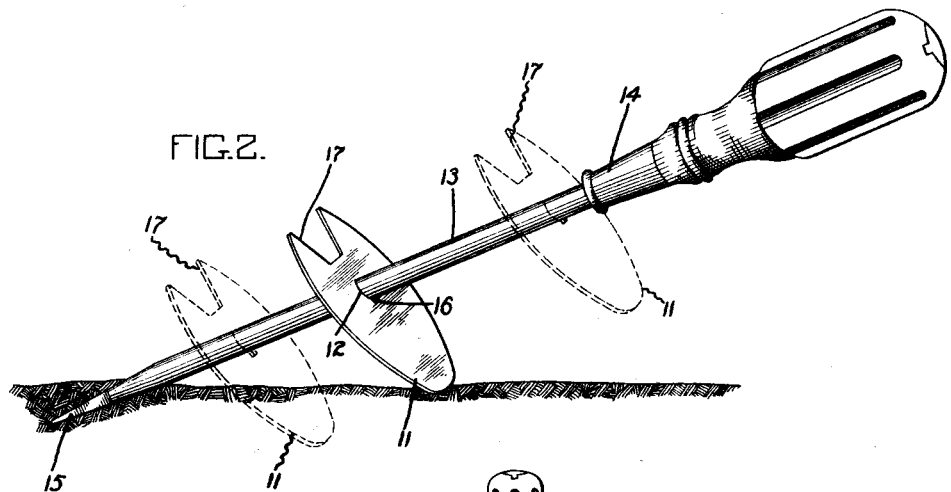
Fig. 2 is a perspective view of an attachment as applied to an ordinary screw driver.

The aperture 12 is large enough to permit ready sliding of the screw driver shank 13 therein. This sliding connection permits adjusting the length of the shank 13 which extends beyond the fulcrum point, whereby this shank may be dug into the soil for any required depth. Thus for example when uprooting small weeds the attachment 11 may be placed upon the screw driver 14 near the blade 15 as illustrated at the left hand end of Fig. 2. On the other hand for weeds of medium depth the attachment 11 may be placed in the full line position of Fig. 2 so as to permit about half of the shank to be active as a digging tool. If however the weed has a deep root and it is required to dig down an appreciable distance, the attachment 11 may be slid up near to the handle as illustrated at the right hand portion of Fig. 2. This adjustment of the attachment is accomplished merely by pushing the shank 13 further into the soil while the attachment lies flat on the surface of the soil.

The slot 17 permits the hand tool 14 to be accurately adjusted with respect to the weed. The curved periphery of the plate 11 resting upon the soil serves as the fulcrum or rest for the screw driver 14, and when the handle thereof is depressed the blade 15 loosens and lifts the weed. Since a substantial amount of weight is taken off by the removal of the material formed by slot 17, the attachment 11 remains constantly in such a position that the slot is at right angles to blade 15 while in use and while moving from one location to another as the weeds are successively extracted. Thus the attachment 11 cannot slip off inadvertently.

Figure 3:
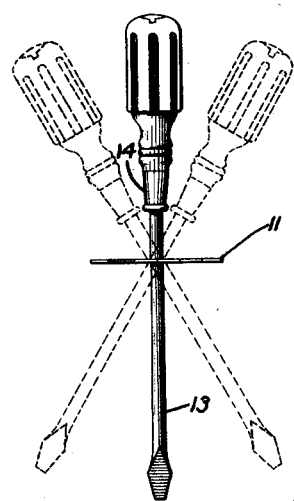
Fig. 3 is a view illustrating how the attachment may be used when the screw driver or other hand tool is laterally moved to loosen the root of the weed.

Another important advantage of the use of the attachment is best described in connection with Fig. 3. In this figure, it often happens that the weed to be loosened must have the soil fairly well agitated near the root, and for this purpose the tool 14 must be moved in a lateral direction. This can readily be accomplished by the aid of the attachment 11 as illustrated in Fig. 3, for the aperture 12 is large enough to permit the movement of the tool 14 from side to side within the limits illustrated by the dotted outlines of tool 14. Furthermore, there is no danger that the location of the fulcrum will be destroyed for where the fulcrum edge is circular, as in this instance, the attachment 11 merely rolls along the soil as the screw driver 14 is moved from side to side.

The advantages of the device as described are evident. It is a comparatively simple matter to adjust the attachment 11 along the shank 13 and to rest it upon the soil in position for digging with the screw driver 14. When so placed a downward push on the handle of the screw driver will serve to eradicate the weed. Then the attachment and the screw driver may be moved in position for the next weed, without disconnection and the process continued as desired.

I claim:

1. A flat plate adapted to be used as a weed puller attachment, having a portion of its periphery curved, and having an aperture for permitting a tool to slide therein, there being a wide and deep slot in the plate.

2. In a weed puller, an apertured fulcrum plate, said plate having a curved edge and a wide and deep slot, and a weed digging tool extending through an aperture in the plate.

3. A flat plate adapted to be used as a weed puller attachment, having a portion of its periphery circular, and an aperture centrally located with respect to the circular portion, said portion extending for more than a half-circle, the remainder of the periphery forming a large slot with sides converging toward the bottom, the bottom of the slot being near the aperture.

4. In a weed puller attachment, an apertured plate, the aperture in the plate having a slot to permit a blade of a digging tool to enter therethrough, and the plate having such a weight distribution that the slot while the device is in use is maintained out of alinement with the blade.

In testimony whereof, I have hereunto set my hand.

FREDERICK G. OSTRANDER.